May 15, 1923.
C. E. DOWNIE ET AL
1,455,046
TRACTOR CULTIVATOR
Filed July 17, 1922
3 Sheets-Sheet 3
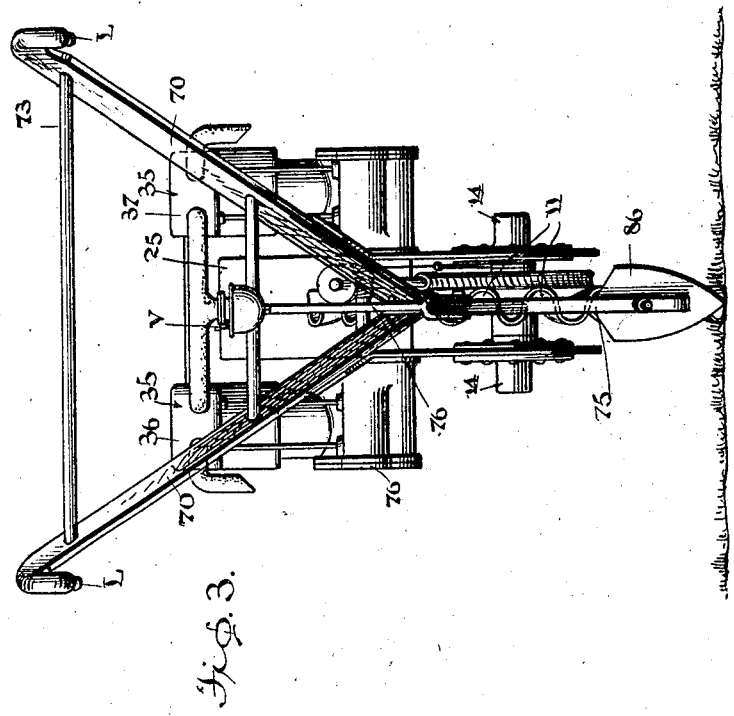
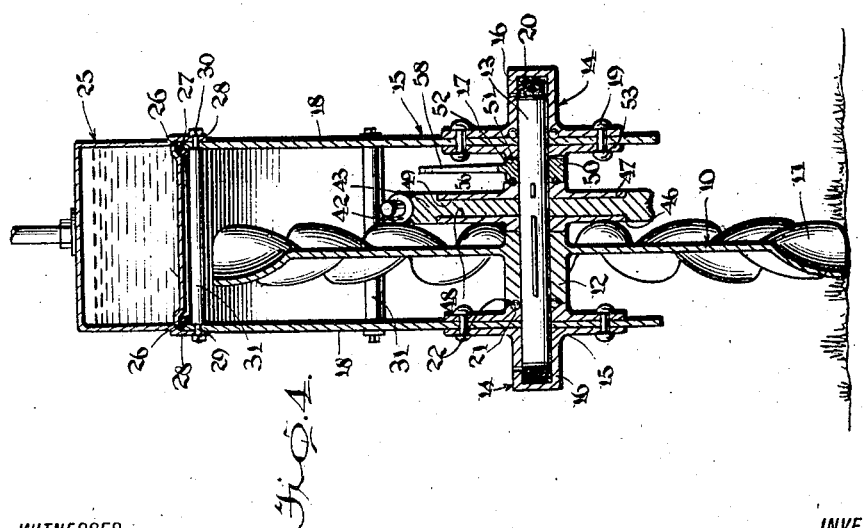
WITNESSES
INVENTOR
C.E. Downie,
G. D. Graveley.
BY
ATTORNEYS Patented May 15, 1923.

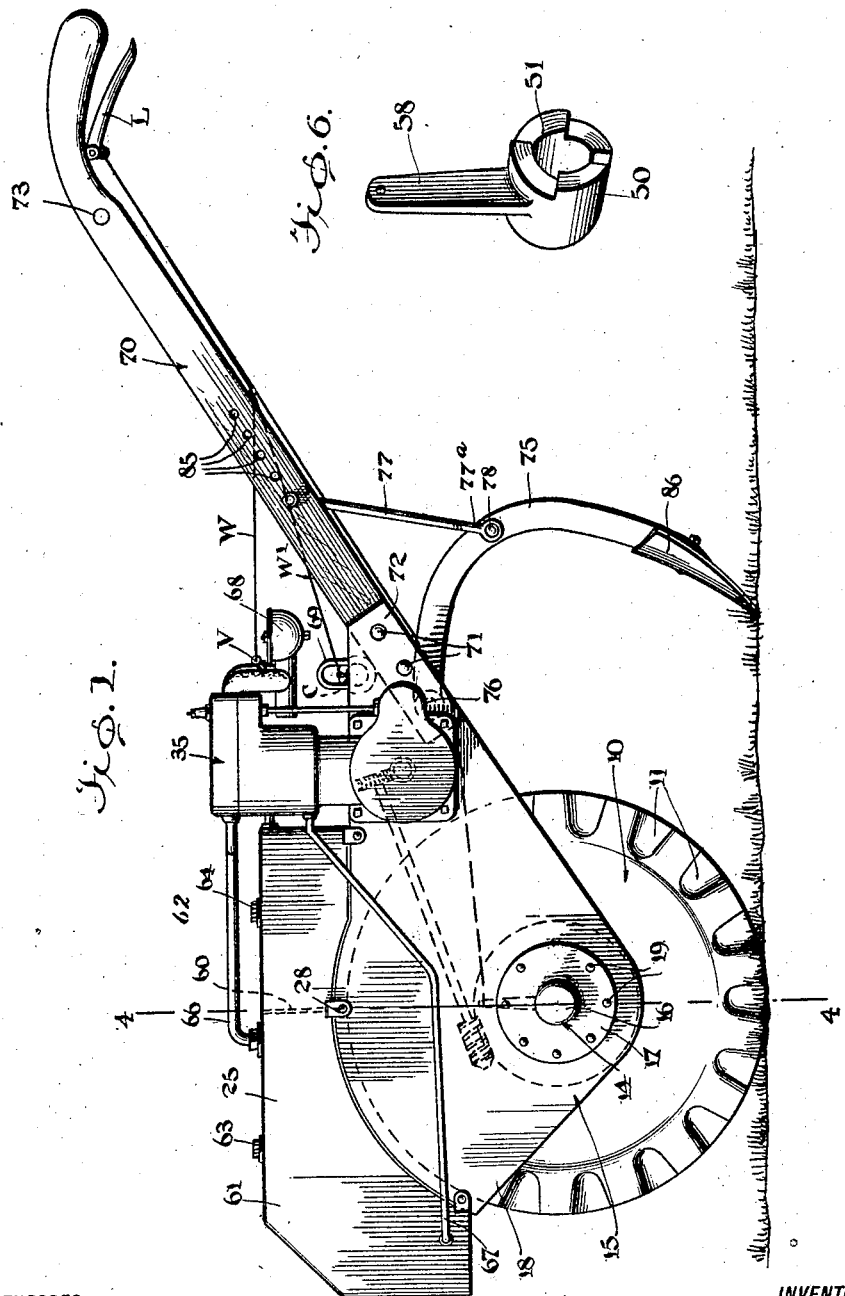

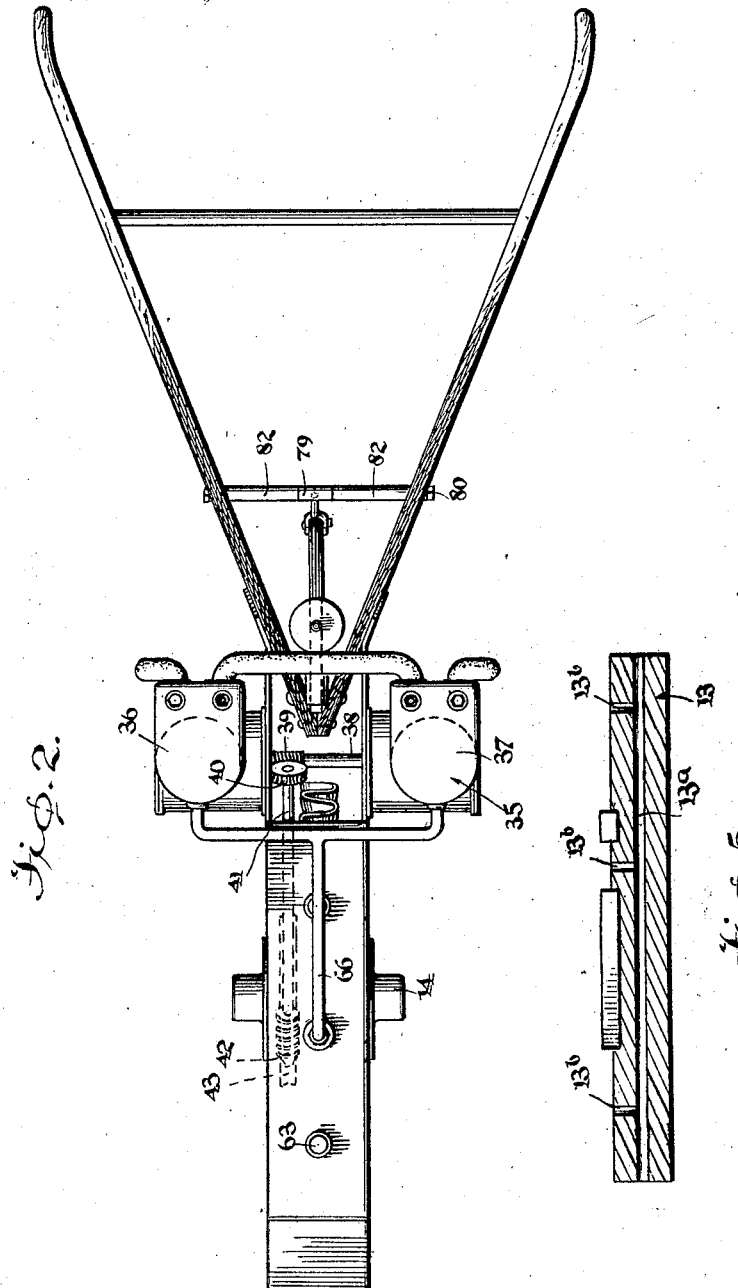

1,455,046

UNITED STATES PATENT OFFICE.

CHARLES EDWIN DOWNIE AND GEORGE D. GRAVELY, OF POMEROY, OHIO.

TRACTOR CULTIVATOR.

Application filed July 17, 1922. Serial No. 575,437.

*To all whom it may concern:*

Be it known that we, CHARLES EDWIN DOWNIE and GEORGE D. GRAVELY, citizens of the United States, and residents of Pomeroy, in the county of Meigs and State of Ohio, have invented certain new and useful Improvements in Tractor Cultivators, of which the following is a specification.

This invention relates in general to agricultural machinery, and more particularly to a tractor cultivator.

The object of the invention is to provide an improved tractor cultivator having a capacity for carrying out the various earth working operations and adapted to be conveniently controlled by a single operator.

Another object is to provide a tractor cultivator including only one traction wheel and yet so organized and constructed as to be highly balanced and as to possess a high degree of lateral stability when in use so as not to require the exercise of any appreciable effort on the part of the operator to maintain the tractor in upright operative position when in use.

Another object is to provide a tractor cultivator including a single traction wheel and driven from a power plant comprising a pair of cylinders symmetrically arranged with respect to the longitudinal axis of the cultivator and so organized with the traction wheel as to be susceptible of driving the same through a positive train of gearing thereby eliminating the necessity of employment of universal joints or other special and expensive devices which operate to transmit the power from the power plant to the traction wheel only at a great loss, the gearing employed in the present invention being highly efficient and operating to apply a powerful driving force to the traction wheel when such is desired.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 1 is a view in side elevation, illustrating the preferred embodiment of the invention;

Figure 2 is a plan view thereof;

Figure 3 is a view thereof in rear elevation;

Figure 4 is a view in transverse vertical section on line 4—4 of Figure 1;

Figure 5 is a detail view in section of the axle of the tractor; and

Figure 6 is a detail perspective view of the clutch operator.

Referring to the drawings wherein for the sake of illustration is shown the preferred embodiment of the invention, it will be seen that the tractor or cultivator constituting the present invention is supported upon a single traction or ground wheel 10, which is embodied in the form of a steel wheel having a corrugated periphery 11, as shown in the drawing and having a hub 12 keyed or otherwise fixed to an axle 13. The axle 13 is journaled in bearings 14 provided therefor and secured to the frame of the tractor, designated generally at 15. The bearings 14 include tubular body portions 16 closed at their outer ends, the inner ends of the body portions being open so as to permit these body portions to receive the ends of the axle 13. Outwardly extending circular flanges 17 are integrally formed with the body portions at their inner ends and these circular flanges abut the side plates or frame members 18 of the frame 15 of the tractor and are secured to these side members 18 by rivets or other suitable fastening means, designated at 19. Between the ends of the axle and the closed ends of the body portion 16 of the bearings 14 felt washers and lubricant, designated at 20 are arranged and the lubricant which may be graphite or any suitable substance is packed not only in the space between the ends of the axle and bars but also in a longitudinal bore 13ª and lateral bores 13ᵇ provided in the axle 13, as clearly shown in Figure 5, the lubricant thus being supplied to the surfaces between which there is relative movement.

The hub 12 and traction wheel 10 abut at one end a thrust bearing 21 secured to the adjacent side plate 18 and including ball bearings 22 or other suitable antifriction devices. The opposite end of the hub abuts the hub of the disk of a clutch mechanism to be hereinafter more fully described.

A tank designated generally at 25 is supported upon the side plates or members 18 of the frame 15, the tank having seats or grooves 26 in its bottom which receive the upper edges of the plates 18, strips of felt or other suitable cushioning material 27 being interposed between the upper edges of the plates 18 and the walls of the seats 26. A plurality of straps 28 are provided and encircle the tank and are connected thereto and the lower ends of these straps overlap the side plates 18. Common means is provided for coacting with the straps 28 to secure the tank upon the plates 18 and for maintaining the plates 18 in proper spaced relation with respect to each other. This means includes a number of bolts 29 which extend through the straps 28 and the plates 18 and which have nuts 30 threaded on the ends thereof and engaging the straps. Spacing sleeves 31 are arranged on the bolts 29 and at the ends of the spacing sleeves abut the opposite plates 18. It is to be noted that a number of straps 28 are vertically arranged, that is they extend around the top of the tank and down over the side plates 18 while other of said straps are horizontally arranged and extend around the forward end of the tank below the plates 18, as clearly shown in Figure 1. A bolt 29, nut 30 and spacing sleeve 31 are provided for each strap as indicated in the drawings.

To the rear of the tank 25 and traction wheel 10 a power plant, designated at 35 is arranged and is supported upon the metallic side plates 18 of the frame 15. This power plant comprises an internal combustion engine having cylinders 36 and 37, the cylinder 36 being arranged on one side of and secured to one of the plates 18 and the cylinder 37 being arranged on the other side of and secured to the other of the plates 18 and these cylinders being symmetrically arranged with respect to the longitudinal axis of the tractor cultivator so that they balance each other and do not detract from the lateral stability of the apparatus. These cylinders 36 and 37 may embody any conventional design of internal combustion engine and the pistons which operate therein serve to drive a common crank shaft 38. The crank shaft 38 extends between the side plates 18 as shown in Figure 2, and the portion of the crank shaft which is comprehended between these side plates has fixed thereto a worm 39 which meshes with a worm wheel 40 secured to one end of a worm shaft 41, the other end of which shaft has fixed thereto a worm 42 meshed with a large worm wheel 43 loosely mounted on the axle 13. Clutch mechanism cooperates with the loose worm wheel 43 for connecting it with the axle 13 when desired so that at such times the motion of the worm wheel 43 will be imparted to the axle 13 and consequently to the traction wheel 10 since the traction wheel is keyed to the axle 13. This clutch mechanism may be of any suitable standard or conventional type and for the sake of illustration is shown as comprising a pair of disks 46 and 47 arranged on the opposite sides of the sprocket wheel 43 and cooperable with friction faces 48 and 49 provided on said sprocket wheel. The disks 46 and 47 are keyed or splined to the axle 13 so as to be constrained to rotate therewith while free to partake of longitudinal motion with respect thereto. A suitable clutch operator is provided for urging the disks 46 and 47 into frictional contact with the friction faces 48 and 49 of the sprocket wheel 43 when it is desired to clutch this sprocket wheel to the axle and preferably this clutch operator comprises a rotatable collar 50 arranged on the axle 13 and having a series of cams 51 provided on one face thereof and cooperable with a coacting series of cams 52 provided on the stationary abutment plate 53 fixed to the adjacent side face 18 and frame 15. Between the collar 51 and the adjacent disk 47 ball bearings 56 are arranged. Any number of these ball bearings 56 may be provided and although one series is shown it is to be understood that a number of series may be provided and may be arranged in spaced relation with respect to each other so as to be entirely independent and one of said series may be arranged to engage the rotatable collar 61 while the other series engages the hub of the disk 47, the function of the loose ring and its ball bearings being to permit the friction disk to rotate relative to the clutch operator while the clutch operator serves at the same time to maintain this friction disk in frictional engagement with the sprocket wheel 43 so as to clutch the sprocket wheel to the axle. An operating arm 58 is integrally formed with or rigidly connected to the collar 51 by means of a controlling wire or other suitable controlling mechanism and enables the operator of the tractor to readily clutch and unclutch the sprocket wheel 43 to the axle 13 so as to transmit the drive to the traction wheel 10 from the power plant 35 or to disconnect this wheel from the power plant as desired.

The tank 25 is divided by a partition 60 into two separate compartments, designated at 61 and 62, respectively, each having a filling plug, designated at 63 and 64. The compartment 61 serves as a water compartment and the compartment 62 serves as a compartment for the fuel, such as kerosene, gasoline or the like.

The water compartment 61 constitutes an element in the cooling system of the engine which is preferably of the thermo syphon type and which is connected to the power plant by means of pipes 66 and 67 after the manner shown in Figures 1 and 2.

The power plant 35 is equipped with a carbureter 68 which receives its supply of fuel from the compartment 62 of the tank 25 and which carburets the same and supplies the combustible mixture to the cylinder of the engine or power plant. The intake pipe which leads from the carburetor to the cylinders of the engine has incorporated therein a throttle valve V of conventional form by means of which the supply of fuel to the engine may be regulated. The internal combustion engine or power plant which is also equipped with a magneto or other form of electric generator 69 in conjunction with which a distributor or commutator of the usual or conventional type is provided is designated at C. The throttle valve V and distributor C are controlled by means of suitable control levers, designated at L connected with the throttle and distributor by means of wires W and W' or other suitable motion transmission mechanism, the levers being pivotally mounted upon the handles to be hereinafter fully described.

A pair of handles 70 extend rearwardly from the frame of the tractor and in diverging relation with respect to each other. The forward ends of these handles are secured, as at 71, to the side plates 18 which have bent portions 72 to accommodate themselves to the divergent relation of the handles. A bracing rod 73 extends between the handles adjacent their rear ends and braces them in proper relation with respect to each other. A curved standard 75 is secured, as at 76, to the ends of the handles which are fastened to the frame 15, the connection 76 being pivotal and enabling adjustment of the standard 75. The adjustment of the standard 75 is brought about and controlled by means of a brace or adjusting rod 77 having a yoke 77ª pivotally connected to the standard 75 by means of a bolt or other fastening device 78 and having a sleeve 79 rotatably mounted on a rod 80 extending between and secured to the handles 70. Spacing sleeves 82 are arranged on the rod 80 and abut the handles and the sleeve 79 to maintain the handles and the sleeve 79 in proper position. The rod or bolt 80 is received in any one of a series of sets of bolt holes 85 provided in the handles 70 and thus the standard 75 is adjusted.

The lower end of the standard 75 is adapted to receive a cultivator shovel 86 or any other suitable earth working element, that is to say, if it is desired, the shovel 86 may be removed and a plow or other earth working element may be applied to the standard 75.

We claim:

1. In a tractor cultivator of the character described, a traction wheel, a rotatable axle keyed to said traction wheel, a frame comprising metallic side plates and spacing means therefor, bearings secured to said side plates and receiving one end of said axle, a power plant supported upon said side plates and including a pair of cylinders, the cylinders being symmetrically arranged with respect to the longitudinal axis of the cultivator and one such cylinder being secured to each of said side plates, said cylinders having a common crank shaft including a portion extending between the side plates, worm gearing for driving the axle from said crank shaft including a worm fixed to a portion of the power plant between the side plates, a transmission shaft actuated from said worm, a worm wheel loosely mounted on the axle and driven from said transmission shaft, and clutch mechanism for connecting the loose worm wheel to the axle.

2. In a tractor cultivator of the character described, a traction wheel, a rotatable axle keyed to said traction wheel, a frame comprising metallic side plates and spacing means therefor, bearings secured to said side plates and receiving the ends of said axle, a power plant supported upon said side plates and including a pair of cylinders symmetrically arranged with respect to the longitudinal axis of the cultivator and one such cylinder being secured to each of said side plates, said cylinders having a common crank shaft including a portion extending between the side plates, worm gearing for driving the axle from said crank shaft including a worm fixed to a portion of the crank shaft between the side plates, a transmission shaft actuated from said worm, a worm wheel loosely mounted on the axle and driven from said transmission shaft, clutch mechanism for connecting the loose worm wheel to the axle, a pair of handles secured to the rear ends of said side plates, a standard connected to said handles, and an earth working element carried by said standard.

3. In a tractor cultivator of the character described, an axle, a single traction wheel including a hub keyed to said axle and a body portion having a corrugated periphery, a frame including spaced side plates, bearings carried by said frame and receiving the ends of said axle, a power plant supported upon said side plates and including a pair of cylinders symmetrically arranged with respect to the longitudinal axis of said cultivator and one of said cylinders being secured to each of said side plates, said cylinders having a common crank shaft including a portion extending between the side plates, worm gearing for driving the axle from said crank shaft including a worm fixed to the portion of the crank shaft between the side plates, a transmission shaft actuated from said worm, a worm wheel loosely mounted on the axle and driven from said transmission shaft, and clutch mechanism for connecting the loose worm wheel to the axle including a rotatable collar having cam surfaces, the adjacent side plate of said frame having an abutment plate secured thereto and provided with a series of cam faces cooperable with the cam faces of the rotatable collar.

4. In a tractor cultivator of the character described, a single traction wheel, a rotatable axle keyed to said wheel, a frame comprising a pair of similar side plates and spacing means therefor, bearings secured to said side plates and receiving the ends of said axle, a power plant supported upon said side plates and including a pair of vertical cylinders symmetrically arranged with respect to the longitudinal axis of the cultivator and one of said cylinders being secured to each of said side plates.

5. In a tractor cultivator of the character described, a single traction wheel, a frame comprising metallic side plates supported upon the wheel, a power plant supported upon said frame and including a pair of vertical cylinders symmetrically arranged with respect to the longitudinal axis of the cultivator, one of the cylinders being secured to one of the side plates and the other cylinder being secured to the other side plate, and a pair of divergent handles connected to the side plates immediately adjacent the cylinders of the power plant.

6. In a tractor cultivator of the character described, a frame including spaced metal side plates, a tank supported upon the plates of said frame and having seats receiving the upper edges of said plates, strips of felt interposed between the walls of said seats and the top edges of said plates, straps encircling the tank and overlapping the side plates of the frame, and common means coacting with the straps for securing the tank in position on said plates and for maintaining said plates in proper relation with respect to each other.

7. In a tractor cultivator of the character described, a frame comprising metallic side plates, a tank arranged upon the upper edges of said side plates, straps connected with the tank and their ends overlapping the side plates, and common means coacting with the straps for securing the tank to the side plates and maintaining the side plates in proper spaced relation and including bolts extending through the strap and the side plates, nuts threaded on the bolts and spacing sleeves arranged on the bolts and abutting the side plates.

CHARLES EDWIN DOWNIE.
GEORGE D. GRAVELY.